H. L. McCULLOUGH.
SELF OILING PULLEY.
APPLICATION FILED OCT. 14, 1916.
1,309,739.
Patented July 15, 1919.
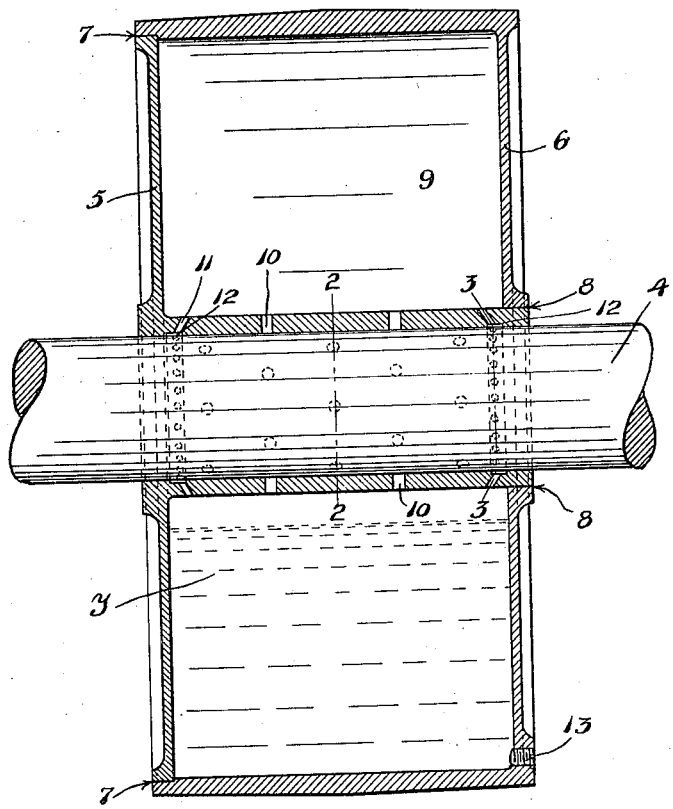
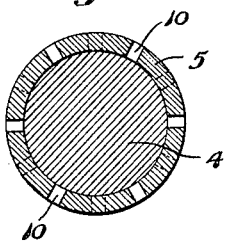
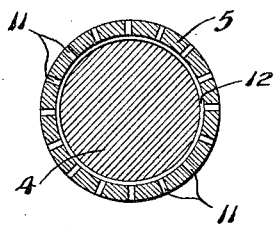
WITNESSES.
H. L. Opsahl.
E. C. Wells
INVENTOR
H. L. McCULLOUGH.
BY HIS ATTORNEYS

UNITED STATES PATENT OFFICE.

HENRY L. McCULLOUGH, OF MINNEAPOLIS, MINNESOTA, ASSIGNOR TO ARTHUR LOREN McCULLOUGH, OF MINNEAPOLIS, MINNESOTA.

SELF-OILING PULLEY.

1,309,739.      Specification of Letters Patent.      Patented July 15, 1919.

Application filed October 14, 1916. Serial No. 125,582.

*To all whom it may concern:*

Be it known that I, HENRY L. McCULLOUGH, a citizen of the United States, residing at Minneapolis, in the county of Hennepin and State of Minnesota, have invented certain new and useful Improvements in Self-Oiling Pulleys; and I do hereby declare the following to be a full, clear, and exact description of the invention, such as will enable others skilled in the art to which it appertains to make and use the same.

My invention has for its object to provide a simple and efficient self-oiling loose pulley; and, to such ends, generally stated, the invention consists of the novel construction and combination of parts hereinafter described and defined in the claims.

In the accompanying drawings which illustrate the invention, like characters indicate like parts throughout the several views.

Referring to the drawings;

Figure 1 shows the pulley in vertical section and the shaft on which it is mounted in elevation;

Fig. 2 is a section taken on the line 2—2 of Fig. 1; and

Fig. 3 is a section taken on the line 3—3 of Fig. 1.

The shaft is indicated by the numeral 4. The pulley, which is in the form of a hollow shell having an axial sleeve or hub, is made up of two members 5 and 6. The member 5 forms one head and the hub or sleeve of the pulley and the member 6 forms the other head and the peripheral rim of the same. The head of member 5 is connected to the peripheral rim of member 6 and the hub of said member 5 is connected to the head of said member 6 by liquid-tight joints 7 and 8, respectively, which joints are preferably jointed with a slight taper, the parts being pressed tightly together, so as to rigidly connect said members 5 and 6. The annular chamber 9 formed within the pulley is adapted to contain lubricating oil Y, preferably, approximately to the elevation indicated in Fig. 1 or to a level normally below the hub of the pulley.

The hub of the pulley is formed with a multiplicity of radial oil ducts 10 and 11. The ducts 10 deliver directly against the shaft 4 while the ducts 11 deliver to internal annular channels 12 formed in the sleeve of the member 5. The numeral 13 indicates a screw plug which normally closes the drain passage in which it is applied and which drain passage also serves to permit the introduction of new oil, if, in fact, new oil should be required during the life of the pulley. A pulley of this character is especially adapted to be mounted loose on a shaft adjacent to the pulley fixed to the shaft, but it is, nevertheless, adapted for general use wherever a loose pulley or wheel is required. In fact, the term "pulley" is herein used in a sense broad enough to include any kind of a rotary member.

When the pulley is at rest, the oil will seek its level, as shown in Fig. 1, but when the pulley is rotated, the oil will, by centrifugal force, be carried upward, and if the speed be sufficiently high, will be caused to hug the rim of the pulley, but when the speed of the pulley slackens, the oil will be precipitated in a shower which falls through the perforations 10 and 11 to keep the journal lubricated. When the pulley then comes to a rest, oil which is in the journal, instead of leaking outward from the ends of the pulley hub and onto the shaft, will run into the annular channels 12, and from thence, will run back into the interior of the pulley.

Here it is important to note that the oil ducts 11 are circumferentially so close together that a horizontal line intersecting the inner extremities of the adjacent lower perforations, will not touch the under surface of the shaft. This prevents the holding of such an amount of oil in the channel 12 that it would contact with the shaft, because the oil will find ready escape under the action of gravity through one or both of the lowermost of said perforations 11. Obviously, if the perforations are so far separated that oil will be pocketed in the channels 12 at an elevation sufficiently high to touch the lower portion of the shaft, it would leak from the pulley at the extremities of the pulley hub.

What I claim is:

1. A pulley comprising a sleeve with an integral head, and a rim with an integral head, both of said heads being the full diameter of the interior of said rim and said sleeve being primarily open at both ends, said sleeve being telescoped into the rim head and the rim being telescoped onto the sleeve head, the said sleeve having radial perforations affording oil passages for oil ducts within the pulley.

2. A hollow pulley adapted to contain oil and having a sleeve extended axially through the pulley for engagement with the shaft, said sleeve, adjacent to the heads of the pulley having internal annular channels and radial oil ducts opening therefrom into the interior of the pulley, the said latter noted oil ducts being circumferentially so close together that the horizontal line intersecting the inner extremities of the adjacent lower members of said perforations will not touch the undersurface of a shaft fitting said sleeve.

In testimony whereof I affix my signature in presence of two witnesses.

HENRY L. McCULLOUGH.

Witnesses:
CLARA DAMAREST,
B. G. WHEELER.

Copies of this patent may be obtained for five cents each, by addressing the "Commissioner of Patents, Washington, D. C."